March 26, 1929.  W. N. OSBURN  1,706,809

WORM GEAR ADJUSTMENT FOR MOTOR VEHICLE STEERING GEARS

Filed June 8, 1925  3 Sheets-Sheet 1

Inventor
Wallace N. Osburn
By Whittemore Hulbert Whittemore & Belknap
attys

March 26, 1929. W. N. OSBURN 1,706,809
WORM GEAR ADJUSTMENT FOR MOTOR VEHICLE STEERING GEARS
Filed June 8, 1925 3 Sheets-Sheet 2
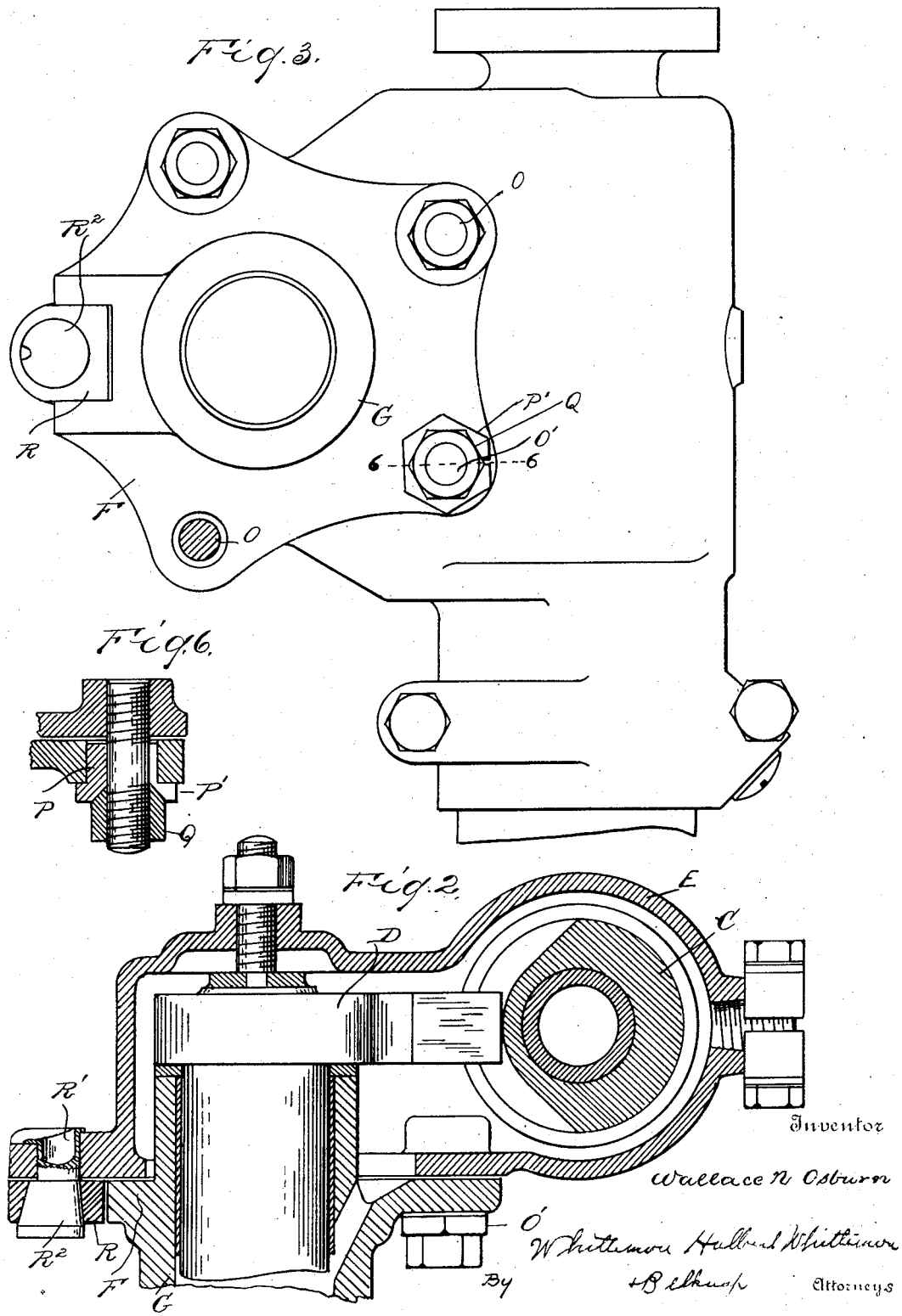

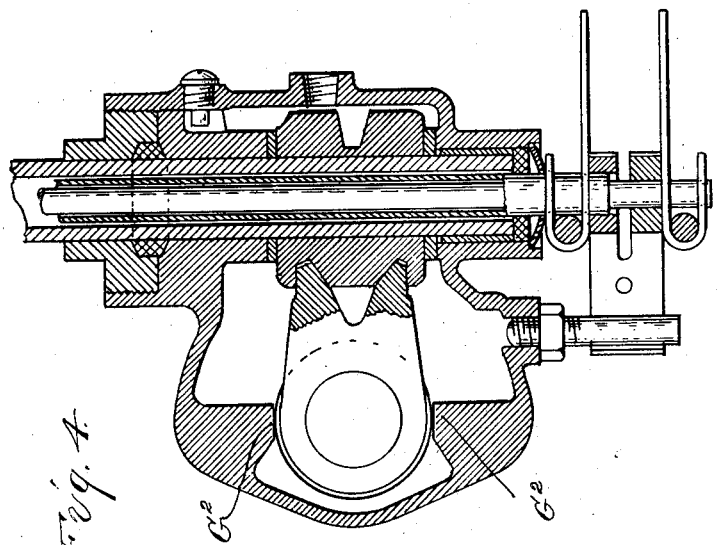
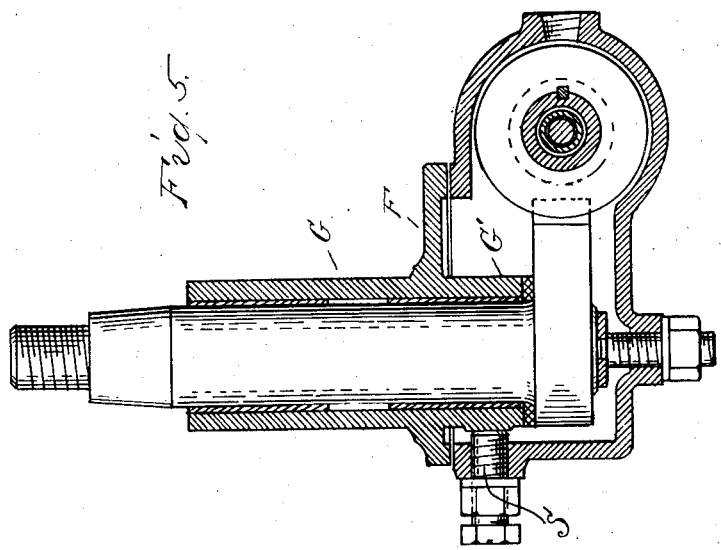

Patented Mar. 26, 1929.

1,706,809

UNITED STATES PATENT OFFICE.

WALLACE N. OSBURN, OF DETROIT, MICHIGAN, ASSIGNOR TO GEMMER MANUFACTURING COMPANY, A CORPORATION OF MICHIGAN.

WORM-GEAR ADJUSTMENT FOR MOTOR-VEHICLE STEERING GEARS.

Application filed June 8, 1925. Serial No. 35,796.

My invention relates to motor vehicle steering gears and has more particular reference to the construction which permits of easy adjustment to take up lost motion and compensate for wearing. The invention therefore consists in the peculiar construction as hereinafter set forth.

In the drawings:

Figure 2 is a cross-section on the line 2—2, Figure 1;

Figure 3 is a side elevation.

Figure 4 is a section similar to Figure 1 showing a modified construction.

Figure 5 is a section at right angles to Figure 4.

Figure 6 is a section on line 6—6 of Figure 3.

Figure 1:
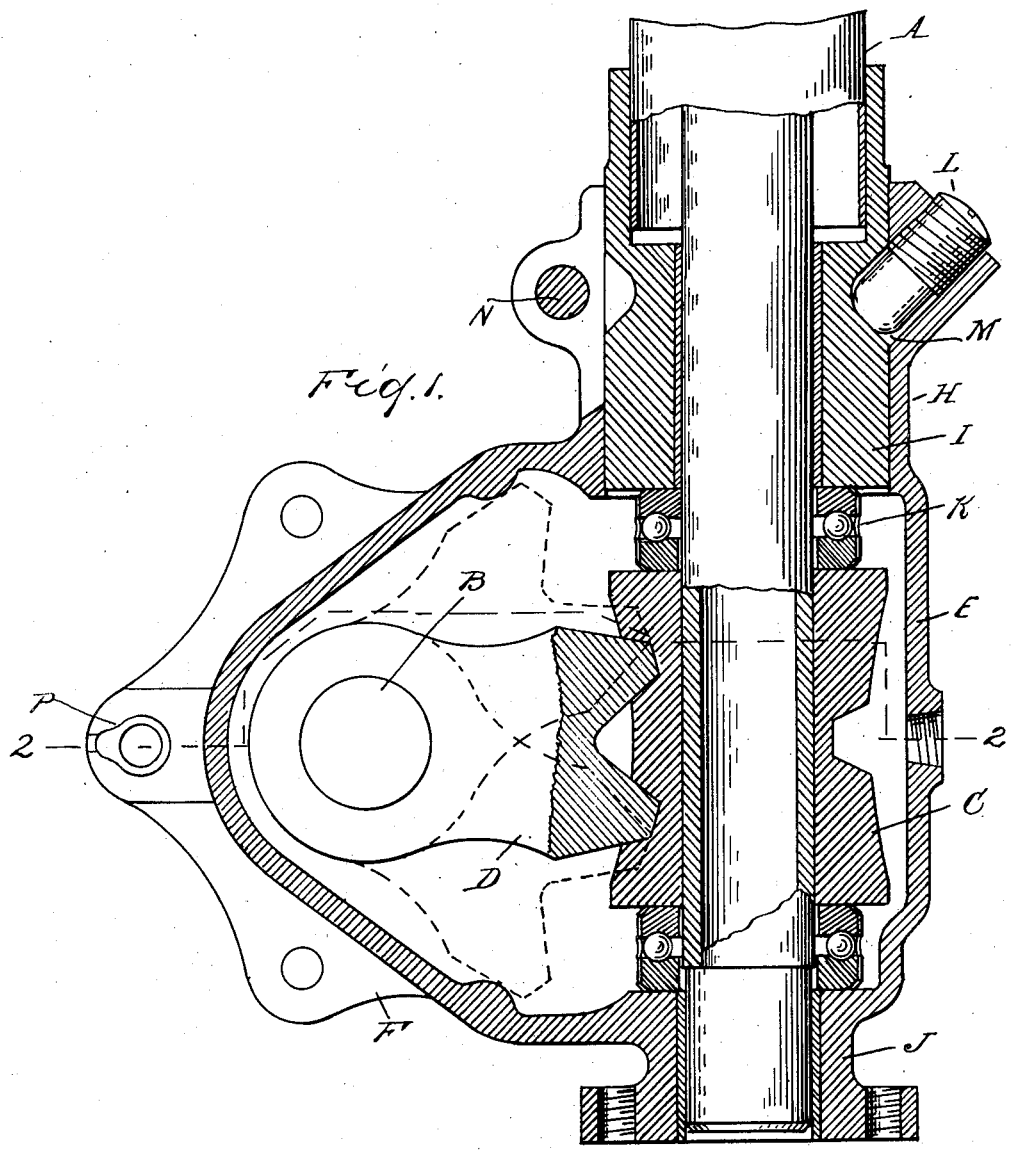
Figure 1 is a section through the steering gear in the plane of the steering stem.

A is the rotary steering stem and B is the rock shaft actuated thereby and having its axis transverse to that of the stem. C is a worm mounted on the stem A; and D is a worm gear intermeshing therewith. As specifically shown, the worm gear D is provided with two teeth having flat faces and the worm is provided with a helical groove such as would be generated by said worm gear when swung through an arc intersecting the worm. However, any other suitable type of gearing may be employed in place of the specific construction shown.

The gear D and worm C are enclosed in a housing which also provides the journal bearing for the rock shaft B and stem A. This housing comprises a member E chambered to receive the gear and worm and apertured for the axial entrance of said member. F is a cover plate for closing the aperture of said chambered member and which is provided with a bearing portion G forming a journal for the rock shaft B. H is a cylindrical portion of the housing E for receiving the bushing I forming a journal for the stem A on one end of the worm C and J is a bearing for said stem at the opposite end of said worm. K are ball end thrust bearings arranged at opposite ends of the worm. L is an adjusting screw engaging an obliquely arranged threaded aperture in the cylindrical housing H and bearing against one face M of an annular groove in the bushing I, the arrangement being such that an adjustment of such screw will move said bushing toward the thrust bearing K. N is a clamping screw engaging a split portion of the cylindrical portion H of the housing and serving to hold the parts in fixed position after adjustment.

To take up lost motion between the gears it is necessary to provide means for relatively adjusting the axis of the stem A and rock shaft B which, with certain constructions heretofore used, has been accomplished by the use of eccentric bushings. With the present invention I avoid the use of such eccentric bushings by providing means for bodily adjusting the cover F so as to carry the bearing G and rock shaft journaled therein toward or from the axis of the rotary stem. As shown in Figures 2 and 3 such adjustment is provided for by securing the cover plate F to the housing with a plurality of clamping bolts or studs O passing through enlarged apertures in the flange of said cover plate. One of these studs O' is provided with an eccentric bushing P externally fitting the enlarged aperture in the cover and provided with a polygonal head P' for turning the same. This bushing is also preferably split and is provided with a conical seat for engaging a clamping nut Q which when tightened will hold the bushing from accidental rotation. Thus, by rotating the bushing the whole cover plate may be moved bodily in a direction to carry the rock shaft B toward or from the axis of the stem A. The rock shaft B must also be held from movement in a transverse direction which in the construction shown in Figures 2 and 3, is accomplished by a bearing block R secured to the housing engaging a slotted bearing in the cover plate. This will permit bodily movement of the cover plate in a direction toward the axis of the rotary stem but will hold said plate from movement in a transverse direction. It is however desirable to adjust transversely in the setting of the gears in relation to each other and to this end the block R is secured to the housing by a pin R' having an eccentric conical head R². When the parts are first assembled the pin R' is free to turn so that its eccentric head may be moved transversely of the slot for the bearing block R but after the parts are once properly adjusted, the pin R is riveted or otherwise secured to prevent further rotation.

A modified construction for bodily adjusting the cover plate F and bearing G is shown in Figures 4 and 5 in which the bearing G has an inwardly extending portion G' fitting between the bearings G² in the housing to prevent lateral movement, also in place of the eccentric bushing B a set screw S may be used for moving said cover plate toward the axis of the steering stem. With each construction the rock shaft B and worm gear D are moved toward or from the axis of the steering stem to produce proper intermeshing relation between the gear and the worm.

What I claim as my invention is:

1. In a steering gear, the combination with a steering stem, a rock shaft to be actuated thereby and intermeshing gears respectively mounted on said stem and shaft, of a housing for said gears formed in a plurality of sections respectively providing journal bearings for said shaft and stem, means for securing said sections to each other providing for the bodily adjustment of one with respect to the other in a direction to move said gears into or out of mesh and guiding means for said members during such movement adjustable in a direction transverse to that of the movement.

2. In a steering gear, the combination with a steering stem, a rock shaft to be actuated thereby and intermeshing gears respectively mounted on said stem and shaft, of a housing for said gears formed in a plurality of sections respectively providing journal bearings for said shaft and stem, means for securing said sections to each other permitting of the bodily adjustment of one to the other in a direction to move said gears into or out of mesh cooperating means for effecting said bodily adjustment and guiding means for said members during said relative movement normally holding the same from transverse movement but adjustable to permit transverse movement in setting the gear mesh.

3. In a steering gear, the combination with a steering stem, a rock shaft to be actuated thereby, and intermeshing gears respectively mounted on said stem and shaft, of a housing for said gears formed in a plurality of sections respectively providing journal bearings for said shaft and stem, means for securing said sections to each other including a stud in the one passing through an enlarged aperture in the other, an eccentric bushing on said stud within said aperture for effecting a relative adjustment of said housing sections in a direction to move said gears into or out of mesh and cooperating guide bearings on said sections for restraining movement of said sections in a transverse direction.

4. In a steering gear, the combination with a housing for the intermeshing gears apertured for the insertion of one of the gear members thereinto, of a cover plate for said aperture, a journal bearing on said cover plate for the shaft of one of said gears, means for securing said cover plate to said housing permitting of the bodily adjustment thereof in a direction to move said gears into or out of mesh and guiding means for said cover plate during such adjustment normally restraining the same from transverse movement, said guiding means being initially adjustable to permit transverse movement in the setting of the gear mesh.

5. In a steering gear, the combination with a housing for the intermeshing gearing apertured for the insertion of one of the gear members thereinto of a cover plate for said aperture, a journal bearing on said cover plate for the shaft of one of said gears, means for securing said cover plate to said housing permitting the bodily adjustment thereof in a direction to move said gears into or out of mesh, means for restraining relative movement of said cover plate and housing in a transverse direction, said means being initially adjustable to permit transverse adjustment in the setting of the gear mesh and means for locking said member after such initial adjustment.

6. In a steering gear, the combination with the housing for the intermeshing gearing apertured for the insertion of one of the gear members thereinto, of a cover plate for said aperture, a journal bearing on said cover plate for the shaft of one of said gears, a stud projecting from said housing passing through an enlarged aperture in said cover, an eccentric bushing between said stud and cover adapted to effect a relative adjustment thereof, a clamping nut for said cover engaging said stud, and a guide bearing for directing the movement of said cover on said housing.

7. In a steering gear, the combination with a housing for the intermeshing gearing apertured for the insertion of one of the gear members thereinto, of a cover plate for said aperture, a journal bearing on said cover plate for the shaft of one of said gears, a plurality of studs projecting from said housing passing through enlarged apertures in said cover plate, an eccentric bushing in one of said enlarged apertures between the stud and cover adapted to effect a bodily adjustment of said cover in a direction to move said gears into or out of mesh, a clamping nut for locking said eccentric bushing from turning and a guide bearing at a point remote from said eccentric bushing for directing the movement of said cover.

8. In a steering gear, the combination with a housing for the intermeshing gearing apertured for the insertion of one of the gear members thereinto, of a cover plate for said aperture, a journal bearing on said cover plate for the shaft of one of said gears, a stud projecting from said housing passing through an enlarged aperture in said cover, an eccentric bushing in said enlarged aperture between said stud and cover, an eccentric member at a point remote from said eccentric bushing constituting a guide for directing the movement of said cover on said housing and adjustable in a direction transverse to said movement and means for locking said eccentric member to hold the same from transverse movement after initial setting of the gears.

9. In a steering gear, the combination with a housing for the intermeshing gearing apertured for the insertion of one of the gear members thereinto, of a cover plate for said aperture, a journal bearing on said cover plate for the shaft of one of said gears, a stud projecting from said housing passing through enlarged aperture in said cover, an eccentric bushing in said enlarged aperture between said stud and cover adapted to effect a relative adjustment thereof, to move said gears into or out of mesh, a clamping nut for said cover engaging said stud, an eccentric guide bearing at a point remote from said eccentric bushing for directing the movement of said cover and adjustable transversely by a rotative movement for the initial setting of the gears and means for locking said eccentric guide from movement after the initial setting of the gears.

In testimony whereof I affix my signature.

WALLACE N. OSBURN.